US012707413B2

(12) United States Patent
Kim et al.

(10) Patent No.: US 12,707,413 B2
(45) Date of Patent: Aug. 11, 2026

(54) TERMINAL OPERATION METHOD AND DEVICE IN WIRELESS COMMUNICATION SYSTEM

(71) Applicant: LG Electronics Inc., Seoul (KR)

(72) Inventors: Sunhee Kim, Seoul (KR); Sangmin Park, Seoul (KR); Myungjune Youn, Seoul (KR)

(73) Assignee: LG Electronics Inc., Seoul (KR)

( * ) Notice: Subject to any disclaimer, the term of this patent is extended or adjusted under 35 U.S.C. 154(b) by 220 days.

(21) Appl. No.: 18/290,414

(22) PCT Filed: May 13, 2022

(86) PCT No.: PCT/KR2022/006897

§ 371 (c)(1),
(2) Date: Nov. 13, 2023

(87) PCT Pub. No.: WO2022/240237

PCT Pub. Date: Nov. 17, 2022

(65) Prior Publication Data

US 2024/0276416 A1 Aug. 15, 2024

Related U.S. Application Data

(60) Provisional application No. 63/187,957, filed on May 13, 2021.

(51) Int. Cl.
*H04W 60/04* (2009.01)
*H04W 24/02* (2009.01)
*H04W 84/06* (2009.01)

(52) U.S. Cl.
CPC .......... *H04W 60/04* (2013.01); *H04W 24/02* (2013.01); *H04W 84/06* (2013.01)

(58) Field of Classification Search
CPC ..... H04W 60/04; H04W 60/00; H04W 84/06; H04B 7/18513; H04B 7/18545
See application file for complete search history.

(56) References Cited

U.S. PATENT DOCUMENTS 12,052,685 B2 * 7/2024 Dou .................... H04W 16/28
2013/0028161 A1 * 1/2013 Maeda .................. H04L 5/005
370/329

(Continued)

FOREIGN PATENT DOCUMENTS

CN 109964509 A 7/2019
CN 111034273 A 4/2020

(Continued)

OTHER PUBLICATIONS

Extended European Search Report in European Appln. No. 22807884.6, mailed on Apr. 4, 2025, 11 pages.

(Continued)

*Primary Examiner* — Khalid W Shaheed
(74) *Attorney, Agent, or Firm* — Fish & Richardson P.C.

(57) ABSTRACT

Disclosed herein is a method for operating a terminal in a wireless communication system, the method may include obtaining, by a terminal, a TAI list from a network, identifying, by the terminal, at least one or more TAs through at least one or more TACs in system information that is broadcast, and transmitting a registration request message to the network according to whether or not there is a TA deleted from the TAI list based on the identified one or more TAs.

7 Claims, 10 Drawing Sheets

(56) References Cited

U.S. PATENT DOCUMENTS

| | | | |
|---|---|---|---|
| 2018/0220289 A1 | 8/2018 | Ryu et al. | |
| 2019/0014552 A1* | 1/2019 | Fan | H04W 72/23 |
| 2019/0223246 A1 | 7/2019 | Huang-Fu et al. | |
| 2020/0351763 A1 | 11/2020 | Wang et al. | |
| 2021/0037496 A1 | 2/2021 | Ryu et al. | |
| 2021/0105693 A1 | 4/2021 | Tripathi et al. | |

FOREIGN PATENT DOCUMENTS

| | | | |
|---|---|---|---|
| WO | WO-2018060548 A1 * | 4/2018 | H04L 69/28 |
| WO | WO 2020/034324 | 2/2020 | |
| WO | WO 2020/197271 | 10/2020 | |

OTHER PUBLICATIONS

Panasonic, "Fixed Tracking Area and the Tracking Area Code in NTN," R2-2009120 (Revision of R2-2006821), 3GPP TSG-RAN WG2 Meeting #112-e, Online, Nov. 2-13, 2020, 4 pages.
ZTE Corporation, Sanechips, "Tracking area management in NTN," R2-1903622 (Revision of: R2-1900829), 3GPP TSG-RAN WG2 Meeting #105bis, Xi'an, China, Apr. 8-12, 2019, 11 pages.
ZTE, Sanechips, "Tracking Area Management and Paging Handling in NTN," R3-190139 (Resubmission—R3-186328), 3GPP TSG RAN WG3 #103, Athens, Greece, Feb. 25-Mar. 1, 2019, 13 pages.
Spreadtrum Communications, "Discussion on TAC updating in NTN," 3GPP TSG-RAN WG2 Meeting #113 bis electronic, R2-2103244, Online, Apr. 20, 2021, 4 pages.
Office Action in Chinese Appln. No. 202280034831.3, mailed on May 28, 2026, 14 pages (with English translation).

* cited by examiner

Figure 9:
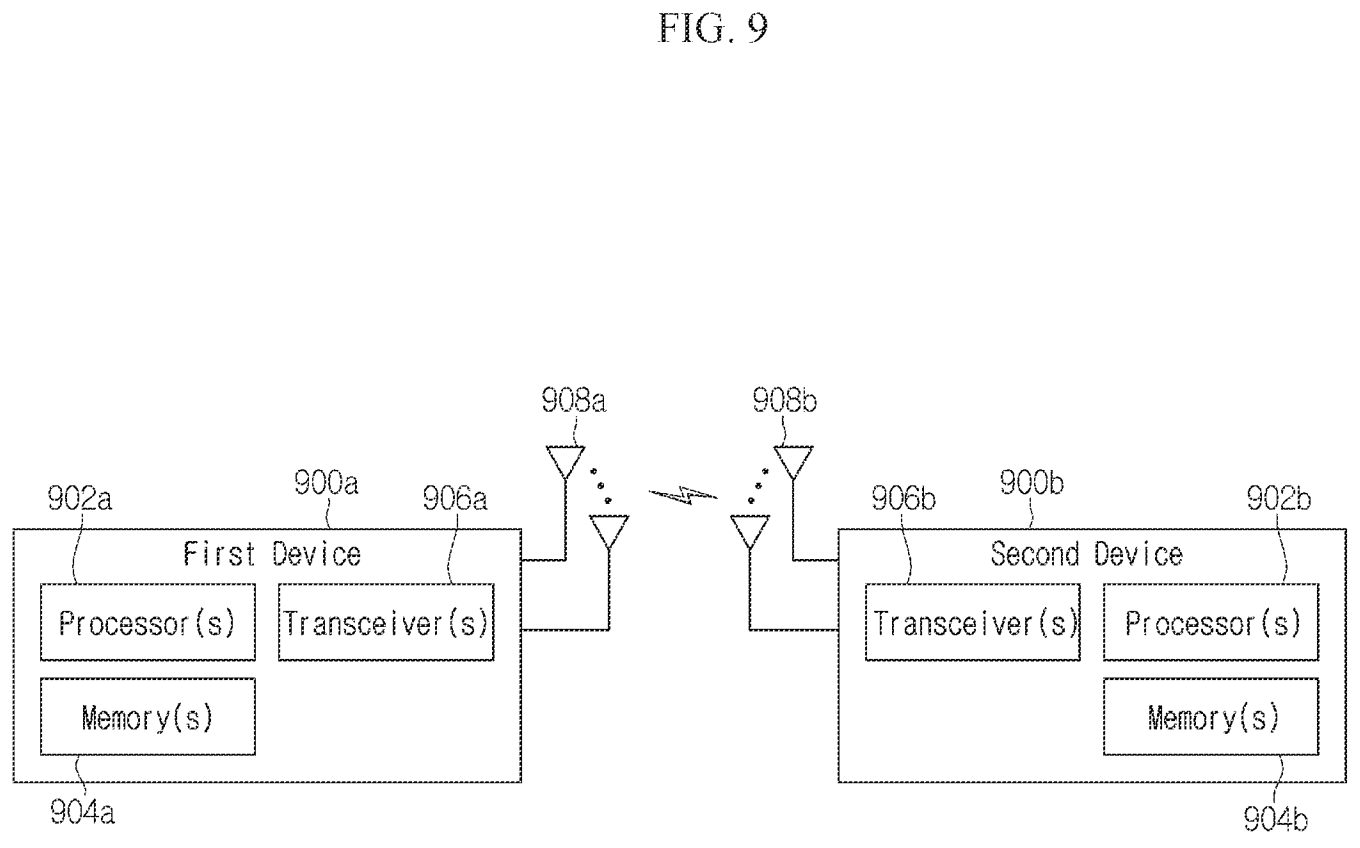

900a First Device
902a Processor(s)
904a Memory(s)
906a Transceiver(s)
908a

900b Second Device
902b Processor(s)
904b Memory(s)
906b Transceiver(s)
908b

TERMINAL OPERATION METHOD AND DEVICE IN WIRELESS COMMUNICATION SYSTEM

CROSS-REFERENCE TO RELATED APPLICATIONS

This application is a National Stage application under 35 U.S.C. § 371 of International Application No. PCT/KR2022/006897, filed on May 13, 2022, which claims the benefit of U.S. Provisional Application No. 63/187,957, filed on May 13, 2021. The disclosures of the prior applications are incorporated by reference in their entirety.

BACKGROUND

Technical Field

The present disclosure relates to a wireless communication system and, more particularly, to a method of operating a terminal. In particular, the present disclosure relates to a method of updating a tracking area identifier (TAI) list of a terminal by considering a satellite cell operation.

Background Art

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

In particular, as a large number of communication devices require a large communication capacity, the enhanced mobile broadband (eMBB) communication technology, as compared to the conventional radio access technology (RAT), is being proposed. In addition, not only massive machine type communications (massive MTC), which provide a variety of services anytime and anywhere by connecting multiple devices and objects, but also a communication system considering a service/user equipment (UE) sensitive to reliability and latency is being proposed. Various technical configurations for this are being proposed.

SUMMARY

The present disclosure may provide a method and device for updating a TAI list by a terminal in a wireless communication system.

The present disclosure may provide a method and device for updating a TAI list by a terminal in consideration of a satellite cell in a wireless communication system.

The present disclosure may provide a method and device for performing mobility management of a terminal based on a satellite cell with a plurality of tracking areas (TAs) in a wireless communication system.

The present disclosure may provide a method and device for performing a registration request procedure by a terminal to a network in wireless communication system.

Technical objects to be achieved in the present disclosure are not limited to what is mentioned above, and other technical objects not mentioned therein can be considered from the embodiments of the present disclosure to be described below by those skilled in the art to which a technical configuration of the present disclosure is applied.

The present disclosure a method for operating a terminal in a wireless communication system, the method comprising: obtaining, by a terminal, a tracking area identifier (TAI) list from a network; identifying, by the terminal, at least one or more tracking areas (TAs) through at least one or more tracking area codes (TACs) in system information (SI) that is broadcast; and transmitting a registration request message to the network according to whether or not there is a TA deleted from the TAI list based on the identified one or more TAs.

The present disclosure a terminal operating in a wireless communication system, the terminal comprising: at least one transceiver; at least one processor; and at least one memory operatively coupled to the at least one processor and storing instructions that cause, when executed, the at least one processor, to perform a specific operation, wherein the specific operation is configured to: control the at least one transceiver to obtain a tracking area identifier (TAI) list from a network, identify at least one or more tracking areas (TAs) through at least one or more tracking area codes (TACs) included in system information (SI) that is broadcast, and control the at least one transceiver to transmit a registration request message to the network according to whether or not there is a TA deleted from the TAI list based on the identified one or more TAs.

The present disclosure a method for operating a network in a wireless communication system, the method comprising: forwarding a tracking area identifier (TAI) list for a terminal; and receiving a registration request message from the terminal, wherein the terminal identifies at least one or more tracking areas (TAs) through at least one or more tracking area codes (TACs) in system information (SI) that is broadcast and transmits the registration request message to the network according to whether or not there is a TA deleted from the TAI list based on the identified one or more TAs.

The present disclosure a network operating in a wireless communication system, the network comprising: at least one transceiver; at least one processor; and at least one memory operatively coupled to the at least one processor and storing instructions that cause, when executed, the at least one processor, to perform a specific operation, wherein the specific operation controls the at least one transceiver to: forward a tracking area identifier (TAI) list for a terminal, and receive a registration request message from the terminal, and wherein the terminal identifies at least one or more tracking areas (TAs) through at least one or more tracking area codes (TACs) included in system information (SI) that is broadcast, and transmits the registration request message to the network according to whether or not there is a TA deleted from the TAI list based on the identified one or more TAs.

The present disclosure a device comprising at least one memory and at least one processor functionally coupled to the at least one memory, wherein the at least one processor controls the device to: obtain a tracking area identifier (TAI) list from a network, identify at least one or more tracking areas (TAs) through at least one or more tracking area codes (TACs) in system information (SI) that is broadcast, and control the transceiver to transmit a registration request message to the network according to whether or not there is a TA deleted from the TAI list based on the identified one or more TAs.

The present disclosure a non-transitory computer-readable medium storing at least one instruction, comprising the at least one instruction executable by a processor, wherein the at least one instruction controls the device to: obtain a tracking area identifier (TAI) list from a network, identify at least one or more tracking areas (TAs) through at least one or more tracking area codes (TACs) in system information (SI) that is broadcast, and control a transceiver to transmit a registration request message to the network according to whether or not there is a TA deleted from the TAI list based on the identified one or more TAs.

In addition, the following matters can be commonly applied.

The present disclosure, based on presence of the TA deleted from the TAI list, the registration request message is transmitted to the network, a registration accept message including updated TAI list information is received from the network, and the TAI list is updated.

The present disclosure, based on the identified one or more TAs being all included in the TAI list, the terminal maintains a connection with the network.

The present disclosure the terminal obtains the TAI list through an initial registration procedure or a mobility and periodic registration update procedure performed with the network.

The present disclosure, based on the terminal identifying a TAC in the system information that is broadcast, an access stratum (AS) layer of the terminal forwards the at least one or more identified TACs to a non-access stratum (NAS) layer of the terminal, and the NAS layer of the terminal identifies whether or not the deleted TA is present in the stored TAI list.

The present disclosure the terminal receives the system information broadcast through a satellite cell.

The present disclosure the satellite cell is a cell with a plurality of TAs and is a moving cell orbiting the earth.

The present disclosure, based on the network receiving the plurality of TAs based on an interface with the satellite cell, the network determines that the plurality of TAs are identical with the TACs included in the system information broadcast to the terminal.

The present disclosure the network configures all of the plurality of TAs to the terminal, based on the TAI list of the terminal being included in the plurality of TAs obtained based on the interface with the satellite cell.

The present disclosure may provide a method for updating a TAI list by a terminal in a wireless communication system.

The present disclosure may provide a method for updating a TAI list by a terminal in consideration of a satellite cell in a wireless communication system.

The present disclosure has an effect of performing mobility management of a terminal based on a satellite cell with a plurality of tracking areas (TAs) in a wireless communication system.

The present disclosure may provide a method for performing a registration request procedure by a terminal to a network in wireless communication system.

Technical objects to be achieved in the present disclosure are not limited to what is mentioned above, and other technical objects not mentioned therein can be considered from the embodiments of the present disclosure to be described below by those skilled in the art to which a technical configuration of the present disclosure is applied.

Effects obtained in the present disclosure are not limited to the above-mentioned effects, and other effects not mentioned above may be clearly derived and understood by those skilled in the art, to which a technical configuration of the present disclosure is applied, from the following description of embodiments of the present disclosure. That is, effects, which are not intended when implementing a configuration described in the present disclosure, may also be derived by those skilled in the art from the embodiments of the present disclosure.

BRIEF DESCRIPTION OF THE DRAWINGS

The accompanying drawings are provided to aid understanding of the present disclosure, and embodiments of the present disclosure may be provided together with a detailed description. However, the technical features of the present disclosure are not limited to a specific drawing, and features disclosed in each drawing may be combined with each other to constitute a new embodiment. Reference numerals in each drawing may mean structural elements.

FIG. 3 is a view illustrating a general E-URTAN and an example of an architecture of an evolved packet core (EPC).

FIG. 7 is a view illustrating an example of functional separation of a general NG-RAN and a 5th generation core (5GC).

FIG. 9 is a view illustrating an example of a wireless device applicable to the present disclosure.

DETAILED DESCRIPTION

Figure 1:
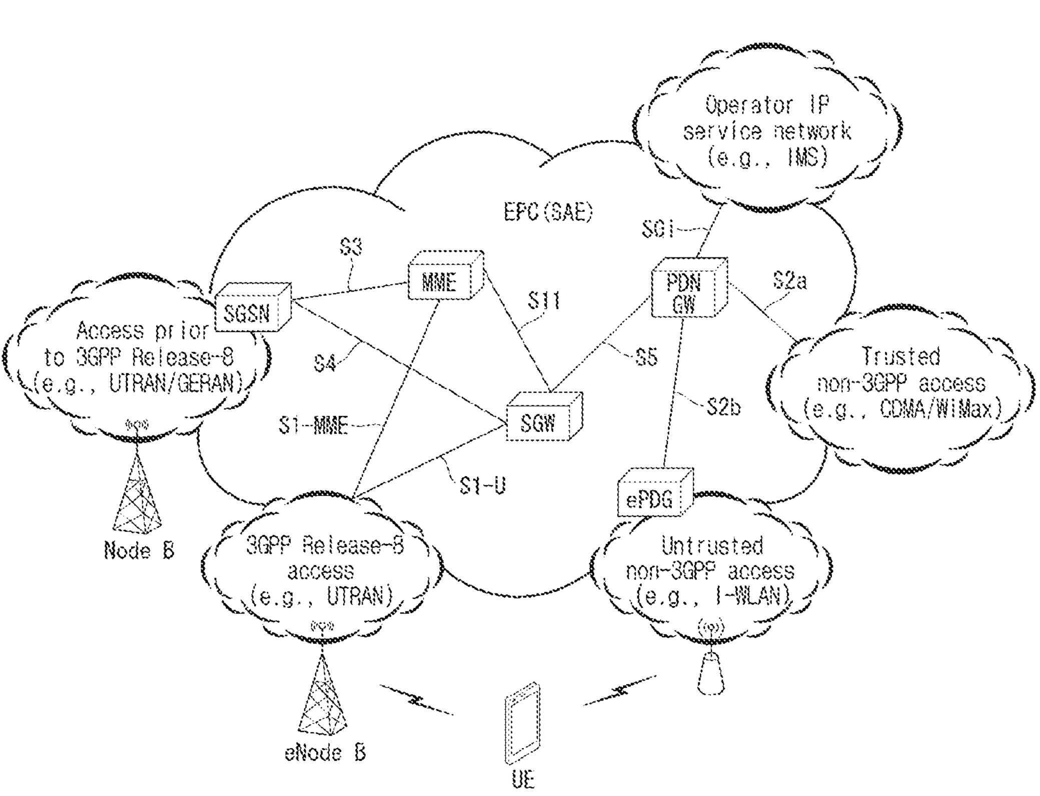
FIG. 1 is a view illustrating various reference points.

Following embodiments are achieved by combination of structural elements and features of the present disclosure in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment.

In the description of the drawings, procedures or steps which render the scope of the present disclosure unnecessarily ambiguous will be omitted and procedures or steps which can be understood by those skilled in the art will be omitted.

In the entire specification, when a certain portion "comprises" or "includes" a certain component, this indicates that the other components are not excluded, but may be further included unless specially described. The terms "unit". "-or/er" and "module" described in the specification indicate a unit for processing at least one function or operation, which may be implemented by hardware, software and a combination thereof. In addition, "a or an", "one", "the" and similar related words may be used as the sense of including both a singular representation and a plural representation unless it is indicated in the context describing the present specification (especially in the context of the following claims) to be different from this specification or is clearly contradicted by the context.

In this specification, the embodiments of the present disclosure are described with focus on the relationship of data reception and transmission between a base station and a mobile station. Herein, the base station means a terminal node of a network that performs direct communication with the mobile station. In this document, a specific operation, which is described to be performed by a base station, may be performed by an upper node of the base station in some cases.

That is, in a network consisting of a plurality of network nodes including a base station, various operations for communicating with a mobile station may be performed by the base station or network nodes other than the base station. Herein, "base station" may be replaced by such terms as "fixed station", "Node B", "eNode B(eNB)", "gNode B(gNB)", "ng-eNB", "advanced base station(ABS)", or "access point".

Also, in the embodiments of the present disclosure, "terminal" may be replaced by such terms as "user equipment (UE)", "mobile station(MS)", "subscriber station(SS)", "mobile subscriber station(MSS)", "mobile terminal" or "advanced mobile station(AMS)".

In addition, a transmission end refers to a fixed and/or mobile node that provides a data service or a voice service, and a reception end means a fixed and/or mobile node that receives a data service or a voice service. Accordingly, in the case of an uplink, a mobile station may be a transmission end, and a base station may be a reception end. Likewise, in the case of a downlink, a mobile station may be a reception end, and a base station may be a transmission end.

The embodiments of the present disclosure may be supported by standard documents disclosed in at least one of the following radio access systems: an IEEE 802 xx system, a 3rd generation partnership project (3GPP) system, a 3GPP long term evolution (LTE) system, a 3GPP 5th generation (5G) new radio (NR) system and a 3GPP2 system, and in particular, the embodiments of the present disclosure may be supported by the following documents: 3GPP TS (technical specification) 38.211, 3GPP TS 38.212, 3GPP TS 38.213, 3GPP TS 38.321, and 3GPP TS 38.331.

In addition, the embodiments of the present disclosure are applicable to another radio access system but is not limited to the above-described system. As an example, they are applicable to a system applied after a 3GPP 5G NR system and are not limited to a specific system.

That is, obvious steps and parts not described in the embodiments of the present disclosure may be described with reference to the above documents. In addition, all the terms disclosed in this document may be explained by the standard document.

Hereinafter, a preferred embodiment according to the present disclosure will be described in detail with reference to accompanying drawings. Detailed descriptions disclosed below together with accompanying drawings are intended to describe example embodiments of the present disclosure and not intended to show any sole embodiment in which a technical configuration of the present disclosure can be implemented.

In addition, specific terms used in the embodiments of the present disclosure are provided to help understand the present disclosure, and such specific terms may be used in any other modified forms without departing from the technical idea of the present disclosure.

The following technology may be applied to various radio access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA) and the like.

For clarity of explanation, the descriptions below are based on a 3GPP communication system (e.g. LTE, NR and the like), but the technical idea of the present disclosure is not limited thereto. LTE may mean a technology after 3GPP TS 36.xxx Release 8. Specifically, the LTE technology after 3GPP TS 36.xxx Release 10 may be referred to as LTE-A, and the one after 3GPP TS 36.xxx Release 13 may be referred to as LTE-A pro. 3GPP NR may mean a technology after TS 38.xxx Release 15. 3GPP 6G may mean a technology after TS Release 17 and/or Release 18. "xxx' means the specific number of a standard document. LTE/NR/6G may be referred to collectively as 3GPP system.

Contents described in standard documents released earlier than the present disclosure may be referred to for the background art, terms and abbreviations used in the present disclosure. As an example, 36.xxx and 38.xxx standard documents may be referred to.

For terms, abbreviations, and other backgrounds that may be used in this document, reference may be made to the following standard document descriptions published prior to this document. In particular, terms, abbreviations, and other background technologies related to LTE/EPS (Evolved Packet System) may refer to 36.xxx series, 23.xxx series, and 24.xxx series, and NR (new radio)/5GS related terms and abbreviations and other backgrounds may refer to the 38.xxx series, 23.xxx series and 24.xxx series.

3GPP LTE/EPS

- 3GPP TS 36.211: Physical channels and modulation
- 3GPP TS 36.212: Multiplexing and channel coding
- 3GPP TS 36.213: Physical layer procedures
- 3GPP TS 36.214: Physical layer; Measurements
- 3GPP TS 36.300: Overall description
- 3GPP TS 36.304: User Equipment (UE) procedures in idle mode
- 3GPP TS 36.306: User Equipment (UE) radio access capabilities
- 3GPP TS 36.314: Layer 2—Measurements
- 3GPP TS 36.321: Medium Access Control (MAC) protocol
- 3GPP TS 36.322: Radio Link Control (RLC) protocol
- 3GPP TS 36.323: Packet Data Convergence Protocol (PDCP)
- 3GPP TS 36.331: Radio Resource Control (RRC) protocol
- 3GPP TS 36.413: S1 Application Protocol (S1AP)
- 3GPP TS 36.423: X2 Application Protocol (X2AP)
- 3GPPP TS 22.125: Unmanned Aerial System support in 3GPP; Stage 1
- 3GPP TS 23.303: Proximity-based services (Prose); Stage 2

3GPP TS 23.401: General Packet Radio Service (GPRS) enhancements for Evolved Universal Terrestrial Radio Access Network (E-UTRAN) access 3GPP TS 23.402: Architecture enhancements for non-3GPP accesses 3GPP TS 23.286: Application layer support for V2X services; Functional architecture and information flows 3GPP TS 24.301: Non-Access-Stratum (NAS) protocol for Evolved Packet System (EPS); Stage 3

3GPP TS 24.302: Access to the 3GPP Evolved Packet Core (EPC) via non-3GPP access networks; Stage 3

3GPP TS 24.334: Proximity-services (ProSe) User Equipment (UE) to ProSe function protocol aspects; Stage 3

3GPP TS 24.386: User Equipment (UE) to V2X control function; protocol aspects; Stage 3

3GPP NR/5GS

3GPP TS 38.211: Physical channels and modulation

3GPP TS 38.212: Multiplexing and channel coding

3GPP TS 38.213: Physical layer procedures for control

3GPP TS 38.214: Physical layer procedures for data

3GPP TS 38.215: Physical layer measurements

3GPP TS 38.300: NR and NG-RAN Overall Description

3GPP TS 38.304: User Equipment (UE) procedures in idle mode and in RRC inactive state 3GPP TS 38.321: Medium Access Control (MAC) protocol 3GPP TS 38.322: Radio Link Control (RLC) protocol 3GPP TS 38.323: Packet Data Convergence Protocol (PDCP)

3GPP TS 38.331: Radio Resource Control (RRC) protocol

3GPP TS 37.324: Service Data Adaptation Protocol (SDAP)

3GPP TS 37.340: Multi-connectivity; Overall description

3GPP TS 23.501: System Architecture for the 5G System

3GPP TS 23.502: Procedures for the 5G System

3GPP TS 23.503: Policy and Charging Control Framework for the 5G System; Stage 2

3GPP TS 24.501: Non-Access-Stratum (NAS) protocol for 5G System (5GS); Stage 3

3GPP TS 24.502: Access to the 3GPP 5G Core Network (5GCN) via non-3GPP access networks 3GPP TS 24.526: User Equipment (UE) policies for 5G System (5GS); Stage 3

3GPP V2X

3GPP TS 23.285: Architecture enhancements for V2X services

3GPP TR 23.786: Evolved Packet System (EPS) and the 5G System (5GS) to support advanced V2X services 3GPP TS 23.287: Architecture enhancements for 5G System (5GS) to support Vehicle-to-Everything (V2X) services 3GPP TS 24.587: Vehicle-to-Everything (V2X) services in 5G System (5GS); Protocol aspects; Stage 3

3GPP TS 24.588: Vehicle-to-Everything (V2X) services in 5G System (5GS); User Equipment (UE) policies; Stage 3

Hereinafter, the present disclosure is described based on the terms defined as above.

Three major requirement areas of 5G include (1) an enhanced mobile broadband (eMBB) area, (2) a massive machine type communication (mMTC) area, and (3) an ultra-reliable and low latency communications (URLLC) area.

Some use cases may require multiple areas for optimization, and other use case may be focused on only one key performance indicator (KPI). 5G supports these various use cases in a flexible and reliable method.

5G System Architecture to which the Present Disclosure is Applicable

A 5G system is an advanced technology from 4G LTE mobile communication technology and supports a new radio access technology (RAT), extended long term evolution (eLTE) as an extended technology of LTE, non-3GPP access (e.g., wireless local area network (WLAN) access), etc. through the evolution of the existing mobile communication network structure or a clean-state structure.

The 5G system is defined based on a service, and an interaction between network functions (NFs) in an architecture for the 5G system can be represented in two ways as follows.

Reference point representation: indicates an interaction between NF services in NFs described by a point-to-point reference point (e.g., N11) between two NFs (e.g., AMF and SMF)

Service-based representation: network functions (e.g., AMF) within a control plane (CP) allow other authenticated network functions to access its services. The representation also includes a point-to-point reference point, if necessary.

Overview of 3GPP System

FIG. 1 illustrates various reference points.

An example of the network structure of FIG. 1 discloses an LTE/EPS-based network structure, and may operate with reference to matters described in standard documents published before this document. In the network structure of FIG. 1, at least one of SGW, PDN GW, MME, SGSN, and ePDG entities may operate with reference to matters described in standard documents published before this document. In addition, S1-MME, S1-U, S2a, S2b, S3, S4, S5, S11, and SGi may exist as interfaces between each entity, which are described in the standard document published before this document. can do. In addition, other entities and interfaces may be configured with reference to matters described in standard documents published before this document described above, and are not limited to specific forms.

Figure 2:
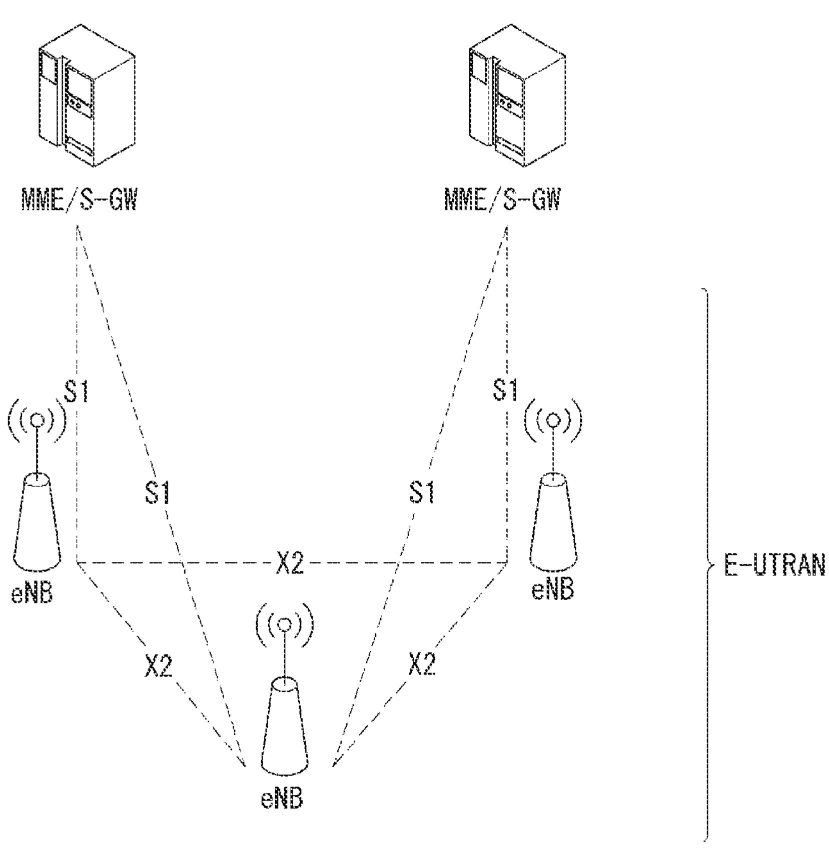
FIG. 2 is a view illustrating an example of a network structure of an evolved universal terrestrial radio access network (E-UTRAN) to which the present disclosure is applicable.

FIG. 2 illustrates an example of a network structure of an evolved universal terrestrial radio access network (E-UTRAN) to which the present disclosure is applicable.

An E-UTRAN system is an evolved version of the existing UTRAN system and may be, for example, 3GPP LTE/LTE-A system. Communication networks are widely deployed to provide various communication services such as voice (e.g., voice over Internet protocol (VoIP)) through IMS and packet data.

Referring to FIG. 2, an E-UMTS network includes an E-UTRAN, an EPC, and one or more UEs. The E-UTRAN consists of eNBs that provide control plane and user plane protocols to the UE, and the eNBs are interconnected with each other by means of the X2 interface, and reference may be made to matters described in standard documents published before this document.

Figure 3:
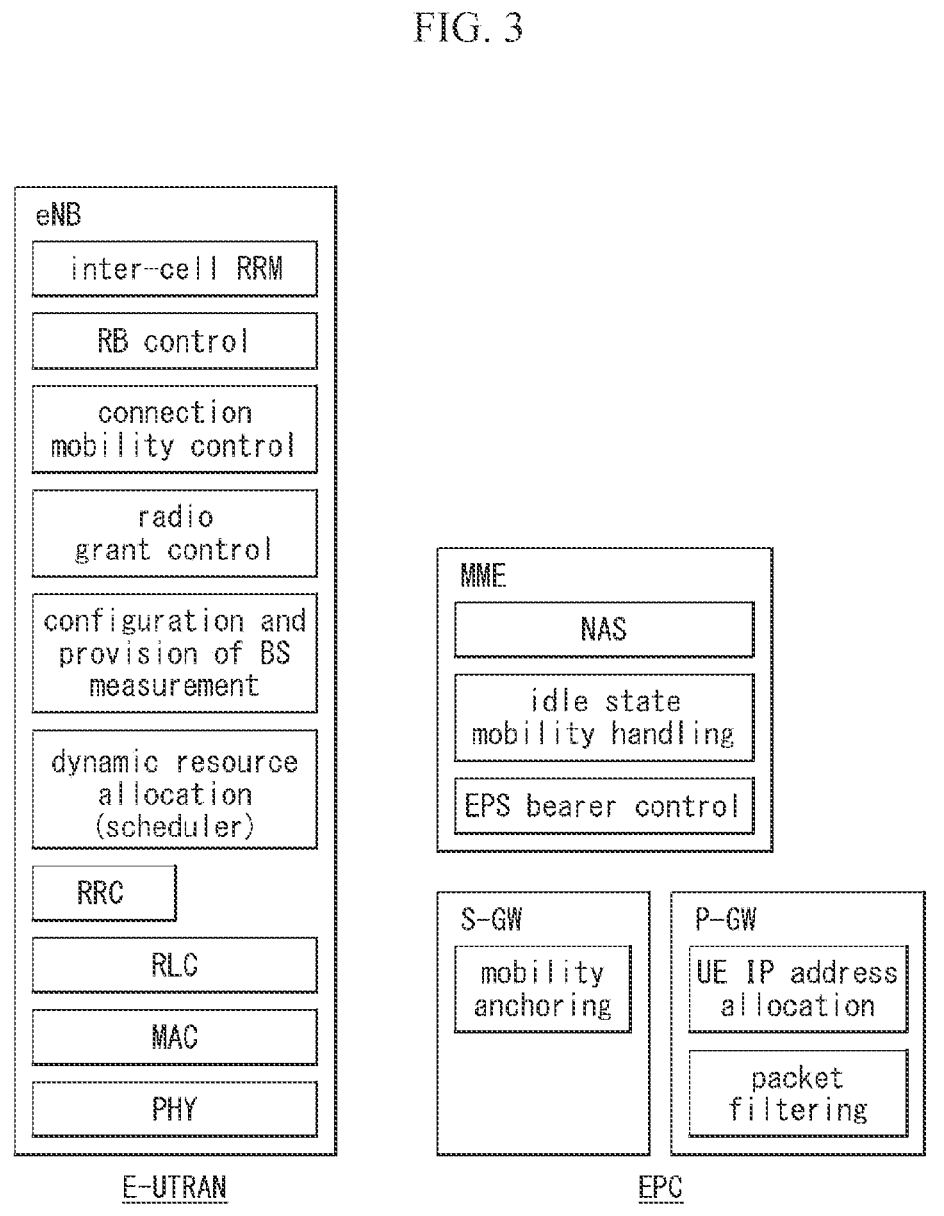

FIG. 3 is a view illustrating a general E-URTAN and an example of an architecture of an evolved packet core (EPC).

As illustrated in FIG. 3, the eNB can perform functions such as routing to gateway while radio resource control (RRC) connection is activated, scheduling and transmission of paging messages, scheduling and transmission of a broadcast channel (BCH), dynamic allocation of resources in uplink and downlink to the UE, configuration and provision for the measurement of the eNB, radio bearer control, radio admission control, and connection mobility control. The eNB can perform functions such as paging situation in the EPC, management of an LTE IDLE state, ciphering of a user plane, SAE bearer control, and ciphering and integrity protection of NAS signaling.

Annex J of 3GPP TR 23.799 shows various architectures combining 5G and 4G. And 3GPP TS 23.501 shows an architecture using NR and NGC.

Figure 4:
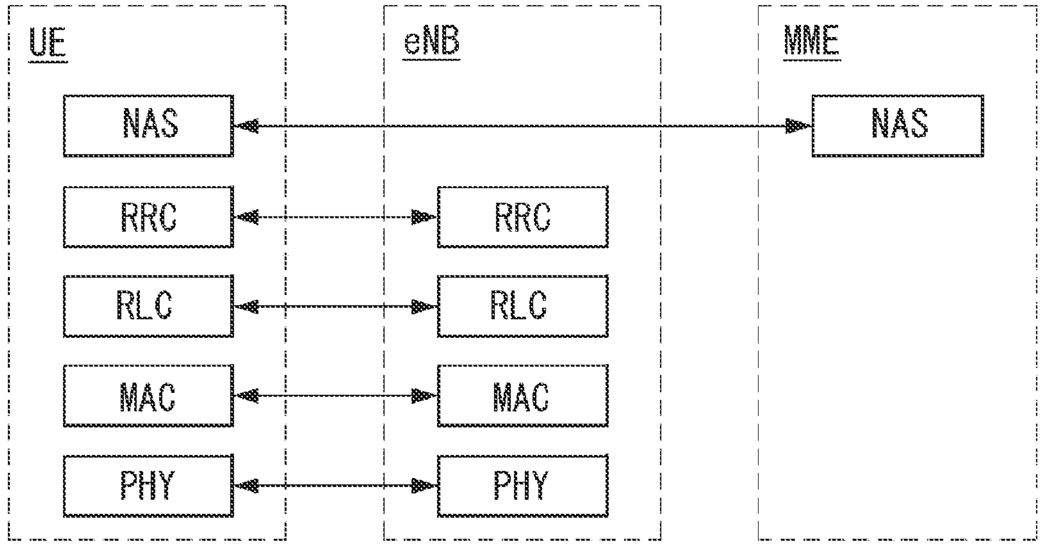
FIG. 4 is a view illustrating an example of a structure of a radio interface protocol in a control plane between user equipment (UE) and evolved node B (eNB).
Figure 5:
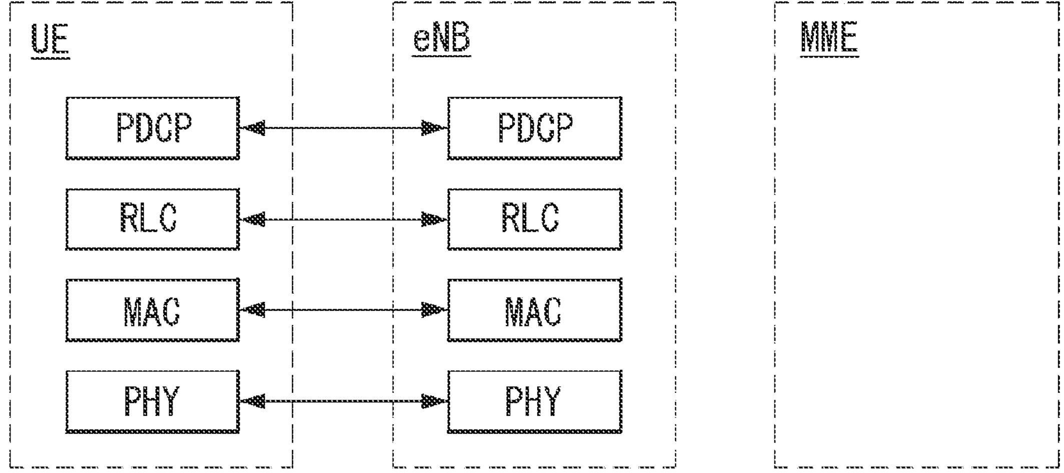
FIG. 5 is a view illustrating an example of a structure of a radio interface protocol in a user plane between UE and eNB.

FIG. 4 is a view illustrating an example of a structure of a radio interface protocol in a control plane between user equipment (UE) and evolved node B (eNB), and FIG. 5 is view illustrating an example of a structure of a radio interface protocol in a user plane between UE and eNB.

The radio interface protocol is based on 3GPP radio access network standard. The radio interface protocol horizontally consists of a physical layer, a data link layer, and a network layer, and is vertically divided into a user plane for data information transmission and a control plane for control signaling delivery.

The protocol layers may be divided into L1 (first layer), L2 (second layer), and L3 (third layer) based upon three lower layers of an open system interconnection (OSI) standard model that is well known in the art of communication systems, and it is possible to refer to the matters described in the standard document published before this document described above.

Figure 6:
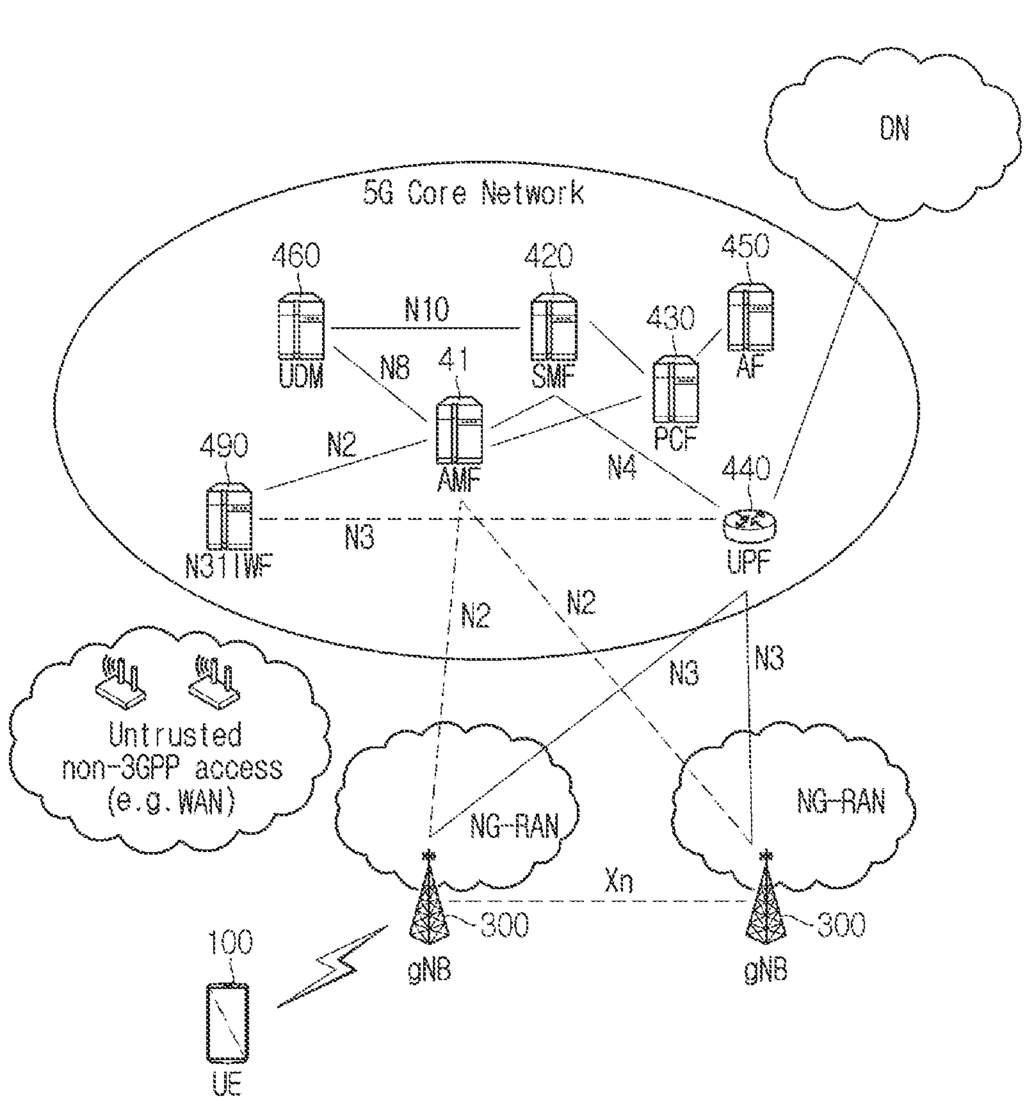
FIG. 6 is a view illustrating an example of an architecture of a general new radio (NR)-radio access network (RAN).

FIG. 6 is a view illustrating an example of a wireless communication system that is applied to the present disclosure.

5GC (5G Core) may include various components, part of which are shown in FIG. 6, including an access and mobility management function (AMF) 410, a session management function (SMF) 420, a policy control function (PCF) 430, a Prose user plane function (UPF) 440, an application function (AF) 450, unified data management (UDM) 460, and a non-3GPP interworking function (N3IWF) 490.

A UE 100 is connected to a data network via the UPF 440 through a next generation radio access network (NG-RAN) including the gNB 300. The UE 100 may be provided with a data service even through untrusted non-3GPP access, e.g., a wireless local area network (WLAN). In order to connect the non-3GPP access to a core network, the N3IWF 490 may be deployed.

The N3IWF 490 performs a function of managing interworking between the non-3GPP access and the 5G system. When the UE 100 is connected to non-3GPP access (e.g., WiFi referred to as IEEE 801.11), the UE 100 may be connected to the 5G system through the N3IWF 490. The N3IWF 490 performs control signaling with the AMF 410 and is connected to the UPF 440 through an N3 interface for data transmission.

The AMF 410 may manage access and mobility in the 5G system. The AMF 410 may perform a function of managing (non-access stratum) NAS security. The AMF 410 may perform a function of handling mobility in an idle state.

The UPF 440 performs a function of gateway for transmitting and receiving user data. The UPF node 440 may perform the entirety or a portion of a user plane function of a serving gateway (S-GW) and a packet data network gateway (P-GW) of 4G mobile communication.

The UPF 440 is a component that operates as a boundary point between a next generation radio access network (NG-RAN) and the core network and maintains a data path between the gNB 300 and the SMF 420. In addition, when the UE 100 moves over an area served by the gNB 300, the UPF 440 serves as a mobility anchor point. The UPF 440 may perform a function of handling a PDU. For mobility within the NG-RAN (which is defined after 3GPP Release-15), the UPF 440 may route packets. In addition, the UPF 440 may also serve as an anchor point for mobility with another 3GPP network (RAN defined before 3GPP Release-15, e.g., universal mobile telecommunications system (UMTS) terrestrial radio access network (UTRAN), evolved (E)-UTRAN or global system for mobile communication (GERAN)/enhanced data rates for global evolution (EDGE) RAN. The UPF 440 may correspond to a termination point of a data interface toward the data network.

The PCF 430 is a node that controls an operator's policy. The AF 450 is a server for providing various services to the UE 100. The UDM 460 is a server that manages subscriber information, such as home subscriber server (HSS) of 4G mobile communication. The UDM 460 stores and manages the subscriber information in a unified data repository (UDR).

The SMF 420 may perform a function of allocating an Internet protocol (IP) address of the UE 100. In addition, the SMF 420 may control a packet data unit (PDU) session.

For convenience of explanation, hereinafter, reference numerals may be omitted for AMF 410, SMF 420, PCF 430, UPF 440, AF 450, UDM 460, N3IWF 490, gNB 300, or UE 100, which may operate with reference to contents described in standard documents released earlier than the present document.

Figure 7:
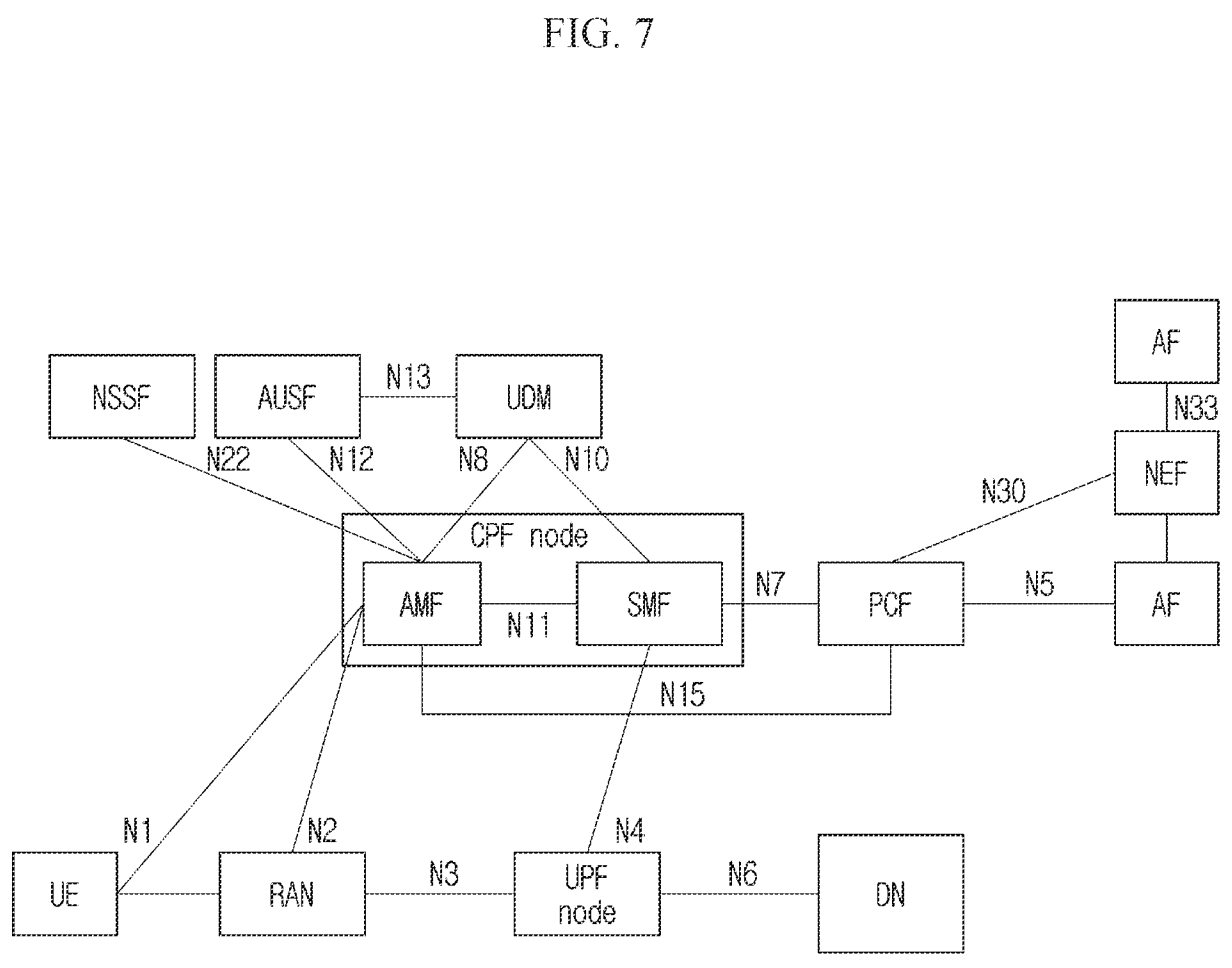

FIG. 7 is a view illustrating an example expressing a structure of a wireless communication system, which is applied to the present disclosure, from a node perspective.

Referring to FIG. 7, a UE is connected to a data network (DN) through a next generation RAN. A control plane function (CPF) node performs all or a part of the functions of a mobility management entity (MME) of 4G mobile communication and all or a part of serving gateway (S-GW) and PDN gateway (P-GW) functions. The CPF node includes AMF and SMF.

A UPF node performs a function of a gateway in which data of a user is transmitted and received.

An authentication server function (AUSF) authenticates and manages a UE. A network slice selection function (NSSF) is a node for network slicing described below.

A network exposure function (NEF) provides a mechanism that safely opens the service and function of 5G core.

Reference points in FIG. 7 are described as follows. N1 represents a reference point between UE and AMF. N2 represents a reference point between (R)AN and AMF. N3 represents a reference point between (R)AN and UPF. N4 represents a reference point between SMF and UPF. N5 represents a reference point between PCF and AF. N6 represents a reference point between UPF and DN. N7 represents a reference point between SMF and PCF. N8 represents a reference point between UDM and AMF. N9 represents a reference point between UPFs. N10 represents a reference point between UDM and SMF. N11 represents a reference point between AMF and SMF. N12 represents a reference point between AMF and AUSF. N13 represents a reference point between UDM and AUSF. N14 represents a reference point between AMFs. N15 represents a reference point between PCF and AMF in a non-roaming scenario and a reference point between AMF and PCF of a visited network in a roaming scenario. N16 represents a reference point between SMFs. N22 represents a reference point between AMF and NSSF. N30 represents a reference point between PCF and NEF. N33 may represent a reference point between AF and NEF, and the above-described entity and interface may be configured with reference to contents described in standard documents released earlier than the present document.

A radio interface protocol is based on the 3GPP radio access network standard. The radio interface protocol is horizontally divided into a physical layer, a data link layer, and a network layer, and is vertically divided into a user plane for transmission of data information and a control plane for transfer of control signal (signaling).

The protocol layers may be divided into L1 (layer-1), L2 (layer-2), and L3 (layer-3) based on the three lower layers of the open system interconnection (OSI) reference model widely known in communication systems.

Figure 8:
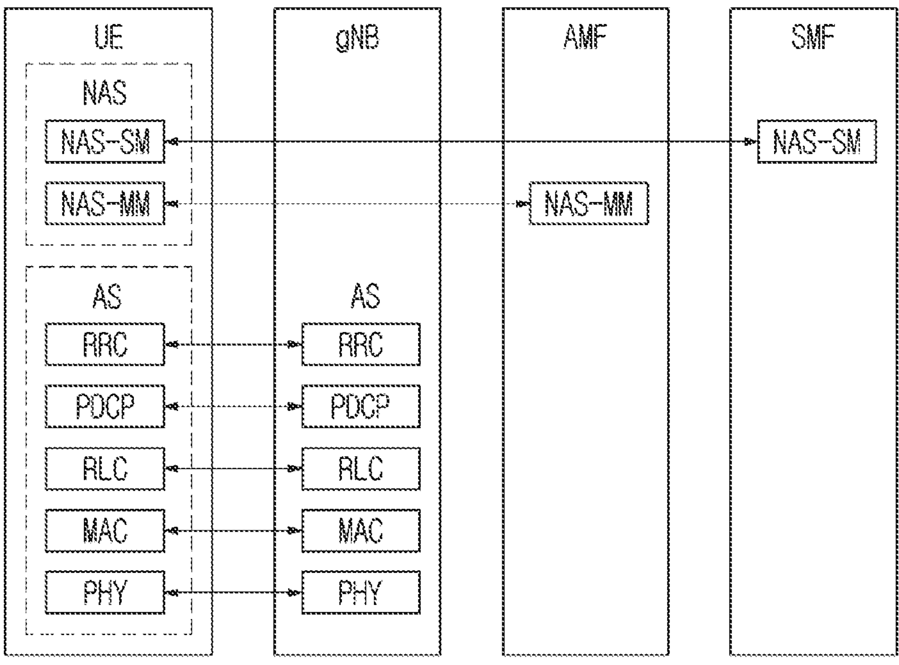
FIG. 8 is a view illustrating an example of a general architecture of a 5th generation (5G) system.

Hereinafter, the present disclosure will describe each layer of a radio protocol. FIG. 8 is a view illustrating an example of a radio interface protocol between UE and gBN.

Referring to FIG. 8, an access stratum (AS) layer may include a physical (PHY) layer, a medium access control layer, a radio link control (RLC) layer, a packet data convergence protocol (PDCP) layer, and a radio resource control (RRC) layer, and an operation based on each layer may be performed with reference to contents described standard documents released earlier than the present document.

Communication System Applicable to the Present Disclosure

Although not limited thereto, various descriptions, functions, procedures, proposals, methods and/or operation flowcharts disclosed in the present disclosure are applicable to various fields requiring wireless communication/connection (e.g., 5G) between devices.

Hereinafter, it will be described in greater detail with reference to the drawings. In the following drawings/description, the same reference numerals may denote the same or corresponding hardware blocks, software blocks or functional blocks unless otherwise stated.

Communication System Applicable to the Present Disclosure

FIG. 9 is a view showing an example of a wireless device applicable to the present disclosure.

Referring to FIG. 9, a first wireless device 900*a* and a second wireless device 900*b* may transmit and receive radio signals through various radio access technologies (e.g., LTE or NR). Here, {the first wireless device 900*a*, the second wireless device 900*b*} may correspond to {the wireless device 100*x*, the base station 90} and/or {the wireless device 100*x*, the wireless device 100*x*}.

The first wireless device 900*a* may include one or more processors 902*a* and one or more memories 904*a* and may further include one or more transceivers 906*a* and/or one or more antennas 908*a*. The processor 902*a* may be configured to control the memory 904*a* and/or the transceiver 906*a* and to implement descriptions, functions, procedures, proposals, methods and/or operational flowcharts disclosed herein. For example, the processor 902*a* may process information in the memory 904*a* to generate first information/signal and then transmit a radio signal including the first information/signal through the transceiver 906*a*. In addition, the processor 902*a* may receive a radio signal including second information/signal through the transceiver 906*a* and then store information obtained from signal processing of the second information/signal in the memory 904*a*. The memory 904*a* may be coupled with the processor 902*a*, and store a variety of information related to operation of the processor 902*a*. For example, the memory 904*a* may store software code including instructions for performing all or some of the processes controlled by the processor 902*a* or performing the descriptions, functions, procedures, proposals, methods and/or operational flowcharts disclosed herein. Here, the processor 902*a* and the memory 904*a* may be part of a communication modem/circuit/chip designed to implement wireless communication technology (e.g., LTE or NR). The transceiver 906*a* may be coupled with the processor 902*a* to transmit and/or receive radio signals through one or more antennas 908*a*. The transceiver 906*a* may include a transmitter and/or a receiver. The transceiver 906*a* may be used interchangeably with a radio frequency (RF) unit. In the present disclosure, the wireless device may refer to a communication modem/circuit/chip.

The second wireless device 900*b* may include one or more processors 902*b* and one or more memories 904*b* and may further include one or more transceivers 906*b* and/or one or more antennas 908*b*. The processor 902*b* may be configured to control the memory 904*b* and/or the transceiver 906*b* and to implement the descriptions, functions, procedures, proposals, methods and/or operational flowcharts disclosed herein. For example, the processor 902*b* may process information in the memory 904*b* to generate third information/signal and then transmit the third information/signal through the transceiver 906*b*. In addition, the processor 902*b* may receive a radio signal including fourth information/signal through the transceiver 906*b* and then store information obtained from signal processing of the fourth information/signal in the memory 904*b*. The memory 904*b* may be coupled with the processor 902*b* to store a variety of information related to operation of the processor 902*b*. For example, the memory 904*b* may store software code including instructions for performing all or some of the processes controlled by the processor 902*b* or performing the descriptions, functions, procedures, proposals, methods and/or operational flowcharts disclosed herein. Herein, the processor 902*b* and the memory 904*b* may be part of a communication modem/circuit/chip designed to implement wireless communication technology (e.g., LTE or NR). The transceiver 906*b* may be coupled with the processor 902*b* to transmit and/or receive radio signals through one or more antennas 908*b*. The transceiver 906*b* may include a transmitter and/or a receiver. The transceiver 906*b* may be used interchangeably with a radio frequency (RF) unit. In the present disclosure, the wireless device may refer to a communication modem/circuit/chip.

In addition, the structure of a wireless device applicable to the present disclosure is not limited to FIG. 9, and may be configured in various forms. In particular, the present disclosure may be applied to a wireless device that performs an operation for transmitting and/or receiving a wireless signal, and is not limited to a specific form.

As an example, when a terminal performs connection access in a terrestrial network, the terminal may perform connection access through a fixed base station. Herein, an access coverage cell in the terrestrial network may be a cell that always has a fixed size. That is, a size of a cell in a fixed base station does not have to flexibly change and may have a fixed size all the time. Accordingly, in case connection access management of a terminal is performed in a network, a tracking area (TA) unit may be fixed at a cell level. As an example, in an existing wireless system (e.g., LTE), a plurality of adjacent base stations may be bound into a single group to which a single TA is allocated. That is, each base station may be configured in advance regarding whether or not it is included in an included TA, and a TA unit may be fixed to a cell level based on the configuration. On the other hand, in the case of a satellite network, since a satellite is orbiting the earth, it may be different from a fixed base station. In addition, as a satellite is located at a high altitude, a size of a cell covered by the satellite may be larger than that of a terrestrial network. As an example, a size of a cell covered by a satellite may be large enough to cover a plurality of countries, but may not be limited to a specific embodiment.

In consideration of what is described above, one satellite cell based on a satellite network may include a plurality of TAs. That is, one satellite cell may broadcast a plurality of TAs to a terminal based on a plurality of TAs within coverage. Herein, as an example, an access stratum layer of the terminal may inform a non-access stratum (NAS) of the terminal of the plurality of TAs. As another example, an AS layer of the terminal may inform the NAS layer of the terminal of one TA selected from the plurality of TAs, but it may not be limited to a specific embodiment.

As an example, a terminal may obtain a tracking area identifier (TAI) list by receiving an initial registration accept message or a mobility registration accept message from a network. Specifically, when a terminal performs initial access to a network, the terminal may forward an initial registration request message to the network. Then, when the network accepts registration of the terminal, the network may transmit a registration accept message to the terminal. Herein, the registration accept message may include a new TAI list for the terminal. When receiving the registration accept message and confirming the new TAI list, the terminal may delete and update an existing TAI list into the new TAI list. As another example, a terminal may transmit a mobility registration request message to a network. The terminal may transmit the mobility registration request message to the network based on movement of the terminal or a preset period. The network may acknowledge the mobility registration request message of the terminal and transmit a registration accept message to the terminal. Herein, the registration accept message may include a new TAI list for the terminal. When receiving the registration accept message and confirming the new TAI list, the terminal may delete and update an existing TAI list into the new TAI list.

Based on the above-described operation, a terminal may store a TAI list. Herein, when the terminal detects a new TA not included in the TAI list, the terminal may perform a mobility and periodic registration update procedure. Thus, the terminal may obtain an updated TAI list from the network. In addition, as an example, a TAI list of the terminal may be deleted when the terminal receives a rejection message from the network due to authentication failure. As another example, when the terminal receives an authentication failure message based on a service unavailability area, the TAI list of the terminal may be deleted. That is, a TAI list stored in the terminal may be newly updated or be deleted but is not limited to a specific form.

In addition, as an example, a mobility and periodic registration update procedure may be performed when a terminal connected to a core network performs a registration procedure. As an example, when the terminal performs a mobility and periodic registration update, the terminal may forward a registration request message to an access and mobility management function (AMF) and receive a registration accept message. As a concrete example, when the terminal detects a movement to an area not included in a TA of a TAI list stored thereon, the terminal may transmit a registration request message. In addition, as an example, when the terminal detects that a specific TA is deleted from the TAI list stored thereon, the terminal may transmit a registration request message, which will be described below. As another example, when a periodic registration update timer expires during an idle state of the terminal, the terminal may transmit a registration request message. In addition, based on other reasons, the terminal may transmit a registration request message to perform a mobility and periodic registration update but is not limited to a specific form.

Herein, for triggering of transmission of a registration request message for the above-described mobility and periodic registration update procedure, an operation considering a satellite network cell may be needed. As an example, a satellite cell may include a plurality of TAs, a mismatch may occur between an actual location of a terminal and the location of the terminal recognized by a network when only a triggering condition for transmission of an existing registration request message is applied, and a method considering this may be needed.

As an example, when a terminal detects that a TA is deleted from a TAI list, the terminal may transmit a registration request message for a mobility and periodic registration update. That is, the deletion of a TA from a TAI list may be a triggering condition of a mobility and periodic registration update procedure.

Specifically, in a satellite access, a terminal may transmit a mobility registration request message as the above-described registration request message to an access and mobility management function (AMF). The AMF may confirm a last registered TAI of the mobility registration request message transmitted by the terminal. Herein, the AMF may receive a plurality of TAs from a satellite cell based on an N2 interface, and the AMF may recognize the plurality of TAs to be identical with a tracking area code (TAC) list transmitted as system information (SI) to the terminal.

In case a last registered TAI transmitted by the terminal is present in a TAI list forwarded through an N2 interface, the AMF may configure all of a plurality of TAs for the terminal.

As an example, when the AMF is capable of recognizing a location of the terminal, the AMF may include TAI list information in a configuration update command based on the location of the terminal and forward the information to the terminal. Even when the AMF receives a registration request message, the AMF does not immediately forward a registration accept message but may forward the registration accept message in a delayed state to the terminal when the terminal reaches a specific location. Next, when the terminal receives system information with the last TAI being removed as TAC update SI, an AS layer of the terminal may forward a TAC broadcast to the system information to an NAS layer of the terminal. Next, the NAS layer may recognize deletion of a specific TA from a stored TAI list. At this time, in case the specific TA is deleted, the terminal may transmit a registration request to the AMF in order to request accurate TA information. Next, the AMF may provide new TA information to the terminal. As an example, the terminal may receive an indication of TAI as a configuration update command message but is not limited to a specific embodiment.

Figure 10:
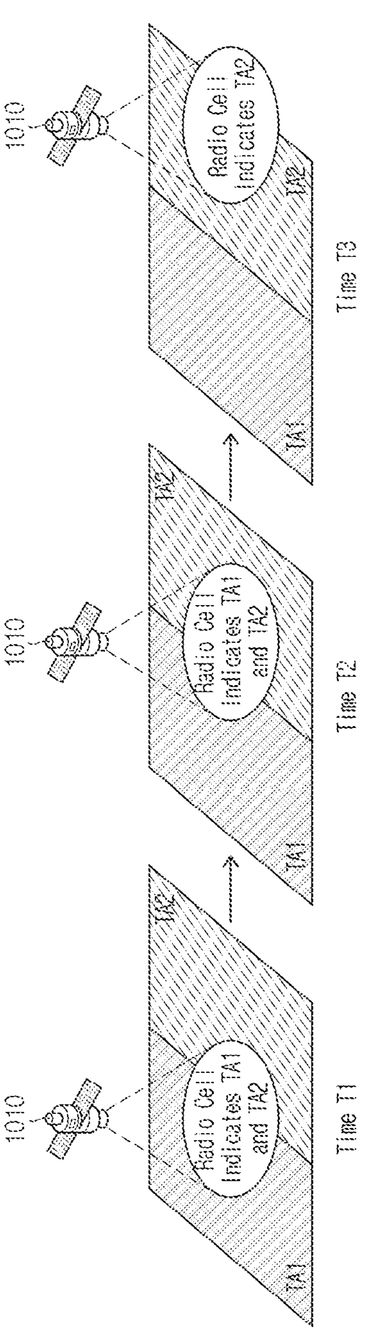
FIG. 10 is a view illustrating a method of broadcasting a TA based on movement of a satellite applicable to the present disclosure.

FIG. 10 is a view illustrating a method of broadcasting a TA based on movement of a satellite applicable to the present disclosure. Referring to FIG. 10, a satellite 1010 may move along the orbit of the earth. Herein, a terminal may obtain TA information which is broadcast based on a satellite cell. As an example, as described above, a plurality of TAs may be broadcast based on a satellite cell.

Specifically, a satellite cell may cover a TA1 at time T0 and broadcast a TAC1 as a tracking area code (TAC) of the TA1 to a terminal. Next, the satellite cell may cover the TA1 and a TA2 at time T1 and broadcast the TAC1 and a TAC2 to the terminal. In addition, although the satellite cell further moves to the TA2 at time T2, it may cover the TA1 and the TA2 and broadcast the TAC1 and the TAC2 to the terminal.

In addition, the satellite cell may move to the TA2 at time T3, cover the TA2, and broadcast the TAC2 to the terminal. That is, the satellite 1010 may cover a moving cell, and a supported TA may change according to the movement of the satellite 1010. Herein, the above-described satellite cell is merely one example for convenience of explanation, and the present disclosure is not limited to the above-described embodiment.

In addition, as an example, in FIG. 10, it is possible to consider a case in which a terminal is located in the TA1 at T0 and T1 and is located in the TA2 at T2 and T3, but this is merely one example, and the present disclosure is not limited to the above-described embodiment.

As an example, when an AS layer of a terminal detects a new TA not present in a tracking area identifier (TAI) list stored in the terminal, the terminal may trigger mobility registration to an access and mobility management function (AMF) based on the newly detected TA. The AMF may receive a mobility registration request from the terminal based on the mobility registration triggering.

As an example, referring to FIG. 10, a terminal may receive the TAC1 and the TAC2 at time T1 by considering the TA1 and the TA2 and consider the TAC2 as a new TA. That is, the terminal may detect a new TA and thus transmit a mobility registration request to the AMF. Herein, the AMF may receive an TAI from a satellite cell through an N2 interface. Herein, when the TAI includes a plurality of TAs, the AMF may determine that a TAI list transmitted by the satellite cell through system information (SI) and a TAI obtained through the N2 interface are identical with each other. Herein, when a last registered TAI transmitted by the terminal is present in a TAI list forwarded through the N2 interface, the AMF may configure all of the plurality of TAs for the terminal. That is, the terminal may obtain the TAI list by trigger a mobility registration request at time T1. As an example, the terminal may receive and configure a TAI list including the TAC1 and the TAC2 based on a satellite cell.

Herein, the AMF may recognize a location of the terminal. As a concrete example, the terminal may move from the TAI to the TA2, which are described above, and the AMF may recognize that the terminal is located in the TA2. When the terminal is present in the TA2, the AMF may include TAI list information in a configuration update command again and inform the terminal of the information. At this time, even when the AMF receives a registration request message from the terminal, the AMF may not immediately transmit a registration accept message but transmit the registration accept message in a delayed state to the terminal when the terminal reaches the TA2.

Next, when the terminal receives system information with the last TAI being removed as TAC update SI, an AS layer of the terminal may forward a broadcast TAC to an NAS layer of the terminal. Herein, the NAS layer of the terminal may recognize that a specific TA is deleted from a stored TAI list. That is, the terminal may recognize based on TAC update SI that the TAC2 is deleted from the TAI list consisting of the TAC1 and the TAC2 based on the TAC update SI. The AS layer of the terminal may forward the above-described information to the NAS layer of the terminal. That is, the terminal may recognize that the TAC1 is deleted based on the TAC update SI. Next, the terminal may forward deletion of a specific TA in the stored TAI list based on TAC update SI to a network. Herein, the terminal may transmit a registration request message to the AMF in order to request accurate TA information again. Next, the AMF may inform the terminal of new TA information. More specifically, the AMF may inform the terminal of a TAI by means of a configuration update command message. That is, the terminal may obtain TAI list information including the TAC2 from the AMF. Based on what is described above, the terminal may obtain TAI list information by recognizing a case in which a specific TA is deleted in a network.

In addition, as an example, it is possible to consider a case in which a terminal is located in the TA1 all the way through T1, T2 and T3 in FIG. 10. Herein, a satellite cell may cover the TA1 and the TA2 at time T1 and time T2, and TAC update SI may include the TAC1 and the TAC2. On the other hand, since the satellite cell is a moving cell, the satellite cell may cover only the TA2 at time T3, and a TAC update may include only the TAC2. Herein, in case a terminal is located in the TA1, the terminal may be disconnected from the above-described satellite cell based on the movement of the satellite cell and detect another satellite cell moving behind or a new cell based on a terrestrial network. Accordingly, the terminal may forward a mobility registration request to an AMF to receive a newly updated TAI list. That is, in FIG. 10, when the location of a terminal is in the TA1, a procedure may be performed to receive an updated TAI list through an AMF. On the other hand, the location of a terminal has changed to that of TA2 at time T2 and time T3, a mobility registration request of the terminal may not be triggered. Accordingly, the terminal compares a TAI list stored thereon with a TA of TAC update SI, and if the terminal recognizes that a specific is deleted, the terminal may trigger a mobility registration request and thus obtain an updated TAI list.

As another example, when the terminal receives TAC update SI, an AS layer of the terminal may forward TAC information broadcast as SI to an NAS layer of the terminal. The NAS layer of the terminal may recognize based on a TAI list stored thereon that a specific TA is deleted. Herein, the terminal may inform a network of deletion of the specific TA and transmit a registration request message to an AMF in order to obtain accurate TA information. Herein, as an example, the registration request message may include information indicating that the registration request message is transmitted based on the deletion of the specific TA. That is, the network may recognize that the terminal transmits the registration request message based on the deletion of the specific TA.

Figure 11:
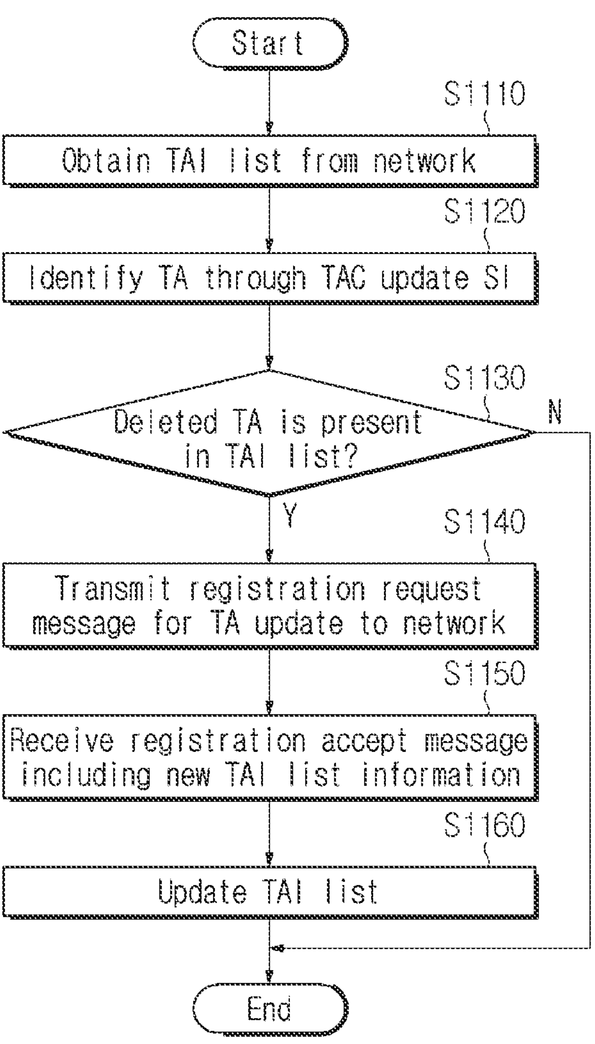
FIG. 11 is a view illustrating a method of updating a TAI list by a terminal applicable to the present disclosure.

FIG. 11 is a view illustrating a method of updating a TAI list by a terminal applicable to the present disclosure. Referring to FIG. 11, a terminal may obtain a TAI list from a network (S1110). That is, as described above, the terminal may obtain TAI list information from an AMF. As an example, the terminal may transmit a registration request to the network based on an initial registration procedure or a mobility periodic registration update procedure and obtain the TAI list information through a response thereto. Next, the terminal may identify a TA through TAC update SI (S1120). As described above, the terminal may identify at least one or more TACs in system information broadcast in a satellite cell. Thus, the terminal may identify at least one or more tracking areas (TAs). As an example, the terminal may identify whether or not there is a TA deleted from a TAI list based on at least one or more identified TAs (S1130). As an example, when there is a TA deleted from the TAI list, the terminal may transmit a registration request message to the network (S1140) and receive a registration accept message including updated TAI list information from the network (S1150). Herein, the terminal may update the TAI list by storing the TAI list of the registration accept message (S1160). On the other hand, when there is no deleted TA, the terminal may maintain a connection with the network.

Herein, as an example, when the terminal identifies a TAC in broadcast system information, an AS layer of the terminal may forward at least one or more identified TACs to a NAS layer of the terminal, and the NAS layer of the terminal may identify whether or not there is a TA deleted from the stored TAI list. Herein, the terminal may forward a mobility registration message to the network based on the deleted TA and thus update the TAI list.

As the examples of the proposal method described above may also be included in one of the implementation methods of the present disclosure, it is an obvious fact that they may be considered as a type of proposal methods. In addition, the proposal methods described above may be implemented individually or in a combination (or merger) of some of them. A rule may be defined so that information on whether or not to apply the proposal methods (or information on the rules of the proposal methods) is notified from a base station to a terminal through a predefined signal (e.g., a physical layer signal or an upper layer signal).

The present disclosure may be embodied in other specific forms without departing from the technical ideas and essential features described in the present disclosure. Therefore, the above detailed description should not be construed as limiting in all respects and should be considered as an illustrative one. The scope of the present disclosure should be determined by rational interpretation of the appended claims, and all changes within the equivalent scope of the present disclosure are included in the scope of the present disclosure. In addition, claims having no explicit citation relationship in the claims may be combined to form an embodiment or to be included as a new claim by amendment after filing.

What is claimed is:

1. A method comprising:

transmitting, by a terminal, a first registration request message to a network;

receiving, by the terminal, a first registration accept message including a tracking area identifier (TAI) list from the network;

receiving, by the terminal, system information from the network, wherein the system information includes one or more tracking areas (TAs) to which a satellite cell belongs through one or more tracking area codes (TACs);

detecting that a deleted TA is present in the TAI list based on the one or more TAs; and transmitting a second registration request message to the network based on the deleted TA being present in the TAI list, wherein, based on the terminal identifying the one or more TACs, an access stratum (AS) layer of the terminal forwards the one or more TACs to a non-access stratum (NAS) layer of the terminal, and the NAS layer of the terminal identifies whether or not the deleted TA is present in the TAI list.

2. The method of claim 1, wherein a second registration accept message including updated TAI list information is received from the network, and wherein the TAI list is updated based on the updated TAI list information.

3. The method of claim 2, wherein, based on the one or more TAs being all included in the TAI list, the terminal maintains a connection with the network.

4. The method of claim 1, wherein the satellite cell is a cell with a plurality of TAs and is a moving cell orbiting the earth.

5. The method of claim 4, wherein, based on the network receiving the plurality of TAs via an interface with the satellite cell, the network determines that the plurality of TAs is identical with the one or more TACs included in the system information.

6. The method of claim 5, wherein the network configures all of the plurality of TAs to the terminal, based on the TAI list being included in the plurality of TAs.

7. A terminal comprising:

at least one processor; and at least one memory operatively coupled to the at least one processor and storing instructions that, based on being executed by the at least one processor, cause the terminal to perform operations comprising:

transmitting a first registration request message to a network;

receiving a first registration accept message including a tracking area identifier (TAI) list from the network, receiving system information from the network, wherein the system information includes one or more tracking areas (TAs) to which a satellite cell belongs through one or more tracking area codes (TACs);

detecting that a deleted TA is present in the TAI list based on the one or more TAs; and transmitting a second registration request message to the network based on the deleted TA being present in the TAI list, wherein, based on the terminal identifying the one or more TACs, an access stratum (AS) layer of the terminal forwards the one or more TACs to a non-access stratum (NAS) layer of the terminal, and the NAS layer of the terminal identifies whether or not the deleted TA is present in the TAI list.

* * * * *